Jan. 10, 1956  G. F. BREWSTER  2,730,370
WORK HOLDING CHUCK
Filed Aug. 13, 1954  2 Sheets-Sheet 1
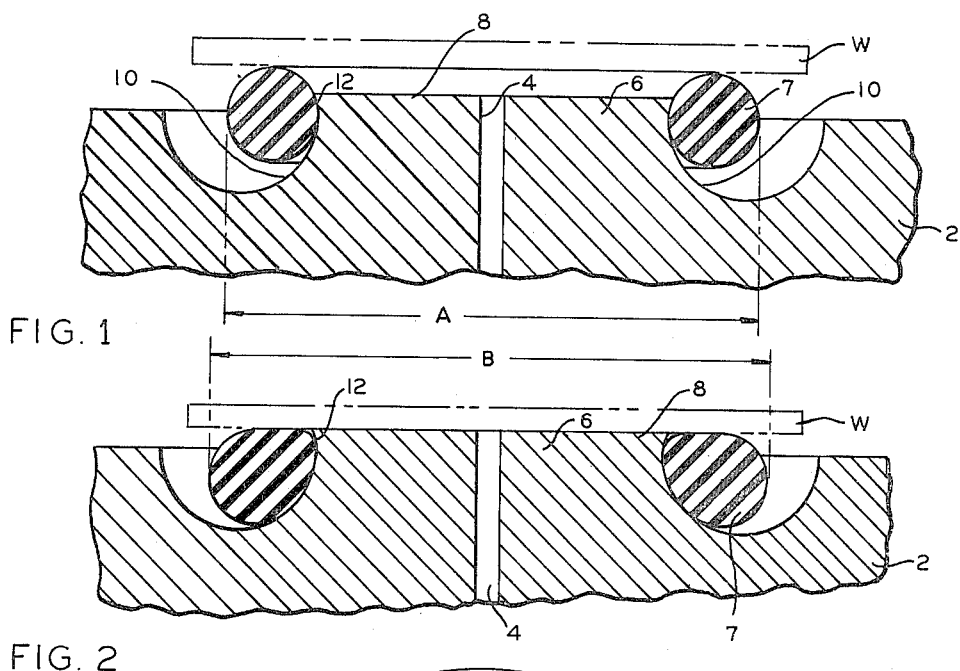
FIG. 1
FIG. 2
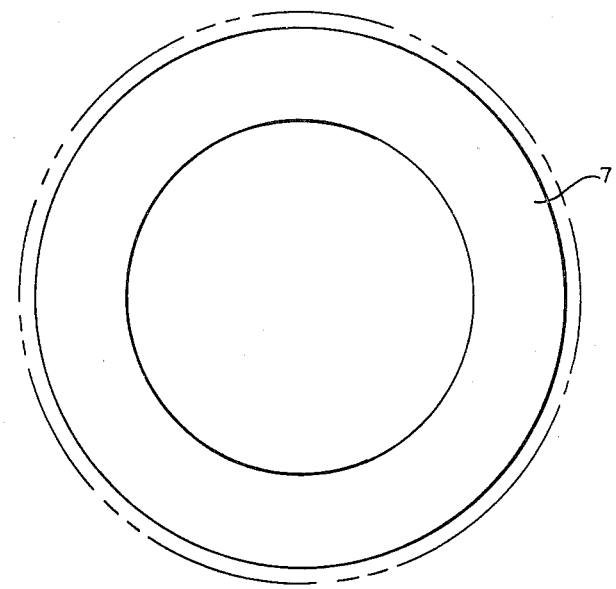
FIG. 3
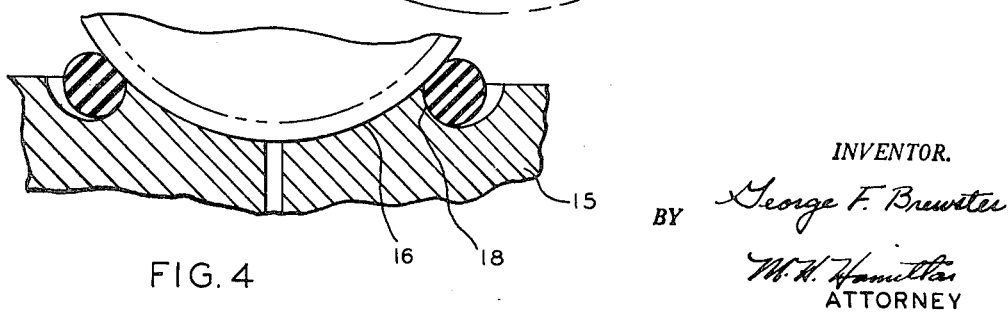
FIG. 4
INVENTOR.
BY George F. Brewster
W. H. Hamilton
ATTORNEY

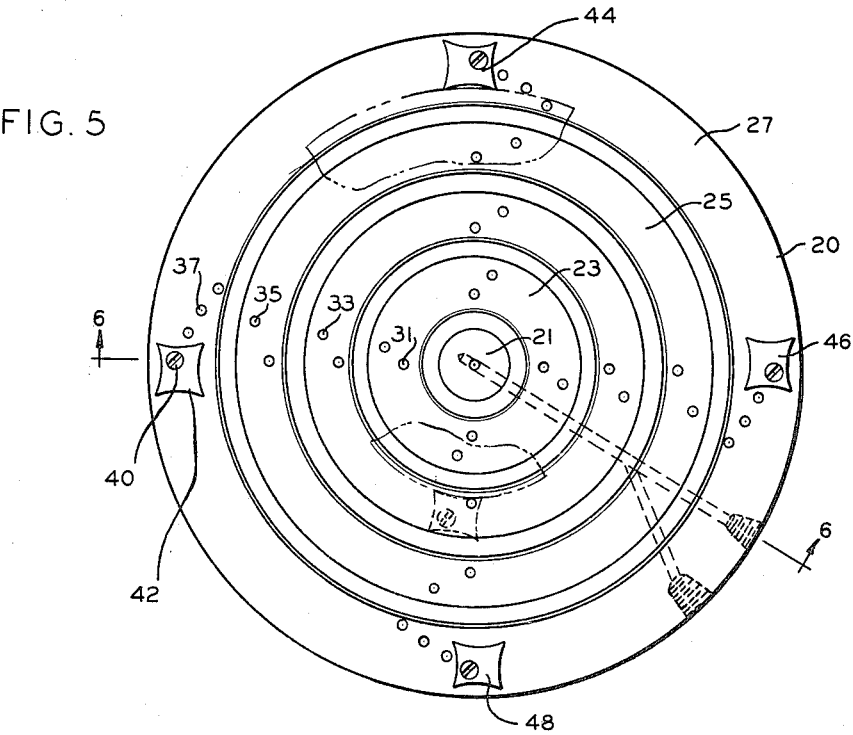
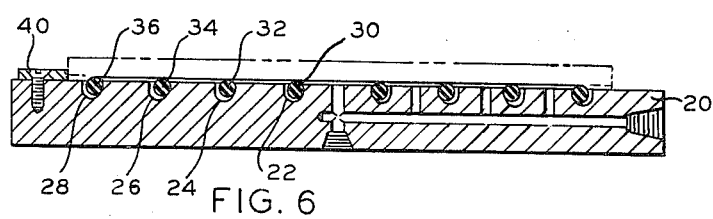
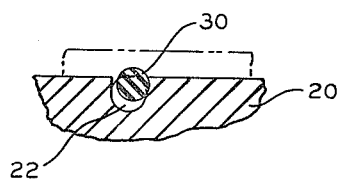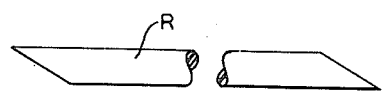
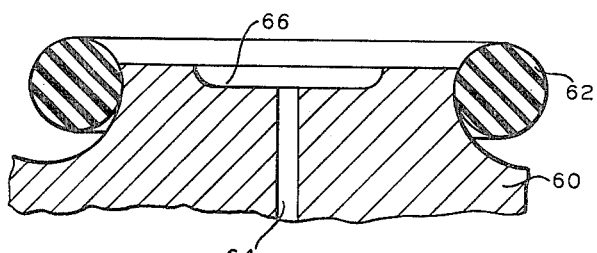
INVENTOR.
George F. Brewster
BY
W. H. Hamilton
ATTORNEY 2,730,370
Patented Jan. 10, 1956

2,730,370
WORK HOLDING CHUCK
George F. Brewster, Kittery, Maine

Application August 13, 1954, Serial No. 449,683

9 Claims. (Cl. 279—3)

This invention relates to an improved work holding chuck of the vacuum-operated type for use in holding surfaces of work pieces which are to be subjected to various machining operations or possibly other treatment or examination.

I am aware that many devices of this general character have been proposed and are well known to those skilled in the art. In all of these devices, so far as I have been able to determine, however, there is present, to a lesser or greater degree, a definite problem in developing an adequately strong holding effect without resorting to the use of expensive and cumbersome equipment whose utilization is prohibitive in a great many instances, particularly where it may be desired to hold relatively small work pieces for fine machining operations and where the surfaces of such small work pieces may be rough or characterized by small irregularities.

The present invention is concerned with the problem indicated and aims to provide an improved method and apparatus of the vacuum-operated type for holding work pieces. It is especially an object of the invention to devise means for sharply increasing the holding effect which can be realized with a vacuum-operated type of chuck, which means is capable of embodiment in a wide range of holding devices and which may be applicable to many different kinds of work pieces in various working operations involving machine tools or other procedures.

These and other objects and novel features will be more fully understood and appreciated from the following description of a preferred embodiment of the invention selected for purposes of illustration and shown in the accompanying drawings, in which Fig. 1 is a fragmentary cross-sectional view showing a simplified form of work holding chuck and sealing means of the invention with a work piece having been indicated in broken lines in a position normally assumed by the work piece just prior to its being brought into engagement with the work piece holder;

Fig. 2 is another fragmentary cross-sectional view of the structure shown in Fig. 1 but further illustrating the work piece in a fully engaged position on the work holder chuck;

Fig. 3 is an elevational view of the sealing ring shown in Figs. 1 and 2 and also indicating in broken lines the position assumed by this member when caused to move into a circumferentially extended shape;

Fig. 4 is a fragmentary cross-sectional view of a modified form of work holding chuck;

Fig. 5 is a view in elevation of another form of work holding chuck illustrating a multiple work holding surface arrangement, together with special clamping means;

Fig. 6 is a cross-section taken on the line 6—6 of Fig. 5;

Fig. 7 is a detail fragmentary view of the structure shown in Figs. 5 and 6;

Fig. 8 is a cross-sectional view of a sealing ring material employed in the invention;

Fig. 9 is a view in elevation illustrating a length of sealing ring material suitable for being cut into desired sealing ring diameters; and Fig. 10 is another modified chuck arrangement of the invention.

I have discovered that the suction-induced holding force normally developed in a conventional type of vacuum-operated chuck may be combined with certain forces developed in stretching an elastic body with the result that I am enabled to provide for holding work pieces in a manner not heretofore realized in the art and, as a result of which, unusual and surprising advantages are realized.

I have found that, in exerting a suction force to draw a work piece against the face of a vacuum type chuck, I may introduce between the face and work piece a special type of elastic sealing member. This sealing member is, in accordance with the invention, located in a position such that it may be caused to become deformed and circumferentially stretched into a shape in which it continually exerts a force of contraction.

I find that this force of contraction properly induced and applied constitutes an independent means of producing a seal between portions of the stretched sealing member and its respective seating surface to the end that this force of contraction cooperates with the conventional suction force and greatly increases the over-all holding power of the chuck.

In this connection, I have devised a chuck body constructed with a special ring seating surface which is characterized by a varying circumference and I have further devised, for use with this ring seating surface, an elastic ring body of toric section whose size and compressibility characteristics are so chosen that the ring may be conveniently received in a position in which it normally projects out of the plane of the face of the chuck body. By means of this arrangement, the projecting portion of the sealing ring may be engaged by the work piece coming into contact with the face of the chuck and the ring as a whole is simultaneously compressed, flattened out and caused to become circumferentially stretched.

A preferred embodiment of the ring seating surface for achieving these results may, I find, comprise a hyperboloidal surface whose diameter, measured at points contacted by the ring in a compressed state, is greater than the inner diameter of this ring to the end that the ring, when fully compressed into a flattened out position, is stretched circumferentially in a degree sufficient to develop an appreciable force of contraction acting in a radially inwardly directed manner all around the hyperboloidal surface.

In conjunction with this force of contraction acting in the manner described, it is pointed out that the flattening out of the sealing ring by the work piece produces an increase in the actual area of contact of the ring against its seating surface so that the force of contraction has an opportunity to act over a relatively larger area which aids materially in sealing a rough or warped surface.

In the structure shown in the drawings, Figs. 1 and 2 illustrate a simplified form of work holding chuck constituting one preferred embodiment of the invention. As noted therein, numeral 2 denotes a vacuum-operated type chuck body for use in holding a work piece W in position to undergo various machine operations of well-known type. The chuck body is recessed to form an air conduit 4 through which air may be exhausted by means of any conventional suction-pumping mechanism. The showing in the drawings of an air conduit 4 is intended to be indicative of a complete suction mechanism of conventional nature and no further showing of additional suction components is believed to be necessary in the drawings.

As is well known to those skilled in the art, the conventional mode of operation of such a vacuum-operated device is to locate a work piece against the face of the chuck and then remove air from between the members, thereby enabling atmospheric pressure to hold the parts against one another. It is pointed out that the degree of holding strength thus conventionally developed is dependent very largely upon the effectiveness of the seal which can be obtained to prevent outside air from passing in between the surfaces. In practice, maintenance of a seal is a very troublesome problem, particularly in dealing with rough or grained surfaces on work pieces, since the sealing action induced by the suction forces available are not always adequate to force the sealing body into sufficiently intimate contact with all of the minute depressions and irregularities which may be present in the surface of the work piece.

In accordance with the invention, I provide for forming a seal which overcomes these difficulties by employing a sealing ring 7 comprised of an elastic material, such as rubber, plastic, or the like, and constructed of toric cross-section such as is commonly represented by the article sold in the trade as an O ring. This sealing ring I mount on a work holding element or boss 6 which preferably is constructed at its top with a flat engaging face 8. Formed around this boss 6 is a specially devised ring sealing surface 10 of the invention, which surface is of varying circumferential characteristics and which, in a preferred form, consists of a double-curved surface formed by moving a curved line of generally hyperbolic shape about a vertical axis to define a hyperboloidal body. The dimensional characteristics of this hyperboloidal body are chosen such that the diameter of the hyperboloidal body, at points therein, is greater than the diameter of the sealing ring and increases progressively, as best shown in Figs. 1 and 2.

In the preferred form of holder shown in Figs. 1 and 2, the structure described results in the formation of a lip portion 12 which has a diameter slightly greater than the inner diameter of the sealing ring and the lip may thus operate to retain the ring on the work holder element in all positions of use in which it may be disposed.

The change in shape and circumference of the sealing ring 7, resulting from drawing the work piece W into contact with the work holder surface, may be more clearly seen from an inspection of Figs. 1 and 2 wherein the arrow A denotes the diameter of the ring before stretching and arrow B indicates the diameter after stretching. This change in dimension is also illustrated by Fig. 3.

Attention is also directed to the fact that the actual area of contact of the ring with its seating surface, as shown in Fig. 2, is nearly twice as large as the area of contact shown in Fig. 1 which, obviously, is a material aid to increasing the desirable sealing action of the ring against its hyperboloidal seat.

Although I have in mind using the toric sealing ring and special seating surface described in many cases in conjunction with a suction-pumping mechanism, I do not wish to limit my invention to such an arrangement or method and I may, on the contrary, desire to utilize the parts described as an independent work holding device used by itself. In this connection, it is pointed out that the unexpectedly strong sealing action which is derived from a circumferentially stretched elastic body makes it possible to develop a very desirable holding strength for some types of articles, and this holding strength is developed simply by pressing a work piece against the work holder element to thereby produce a limited vacuum effect useful for many purposes and not necessarily confined to work holding chuck structures.

I may also desire to utilize the holding effect described in conjunction with a curved surface, including either a convex or a concave surface. Figure 4 illustrates, for example, a holder 15 having a concaved surface 16 around which is provided a ring 17 on a ring seating surface 18 of the character already described. Such an arrangement is intended to be employed in holding work pieces or other articles having surfaces which are curved.

In Figs. 5, 6 and 7, I have illustrated another form of work holder 20 in which are formed a number of concentric grooves, as 22, 24, 26 and 28, which define a series of progressively larger work holding elements, as 21, 23, 25 and 27. All of these work holding elements are constructed with hyperboloidal ring retaining surfaces of the invention and may support sealing rings as 30, 32, 34 and 36, used either separately or in conjunction with one another. A feature of this construction is the provision in each of the work holding elements, 21, 23, 25 and 27, of holes, as 31, 33, 35 and 37, in which may be engaged screws, as 40, to hold clamps 42, 44, 46 and 48. The latter members may be placed at any desired points on the respective holding elements to hold a work piece against displacement from laterally directed forces which might operate to slide the work piece sideways and thus break the seal. The various sealing rings in any of the grooves will normally extend upwardly, as shown in Fig. 7.

In Fig. 8, I have illustrated the use of elastic material R in varying lengths so that, for any desired diameter of ring required, for example in the multiple face chuck body 20, I may cut off a piece of stock, as shown in Fig. 9, cement the ends of this piece together and install.

I may also desire to use a sealing ring with a hyperboloidal seat in connection with a recessed chuck of the type shown in Fig. 10 to obtain a large vacuum pocket from which air is exhausted. This numeral 60 denotes a chuck body formed with an air passage 64 which communicates with the opening defined by the recessed surface 66. A ring 62 engages this chuck body around its sealing surface of the same general type described.

It will be seen that I have thus devised an improved method and apparatus for producing a vacuum-operated sealing effect which may be applied, particularly in reference to holding work pieces on a chuck member but which may also be used, generally, wherever a holding operation is required, and it is possible to remove air from between the work holding element and a surface to be engaged thereagainst.

While I have shown and described preferred embodiments of the invention, it should be understood that various other changes and modifications may be resorted to in accordance with the scope of the appended claims.

I claim:

1. In a vacuum-operated chuck for holding a work piece, a work holding element, an elastic sealing ring, a ring seating surface formed on said work holding element and normally adapted to receive and support the sealing ring in a position in which it projects beyond one side of the holding element, and said ring seating surface being formed with a groove having a hyperboloidal surface for causing the ring to move into a circumferentially extending position when the said work piece is forced into contact with the work holding element.

2. In a vacuum-operated type chuck for holding a work piece, a work holding element including suction means for holding a surface of the work piece thereagainst by atmospheric pressure, an elastic sealing ring, said work holding element being recessed to define a groove having a hyperboloidal cross-section for receiving said sealing ring and normally supporting it in a position in which portions of the ring project beyond the work holding element, the diameter of the groove at some points exceeding the inner diameter of the sealing ring.

3. An improved work piece chuck comprising a work holding element having a ring groove formed therein, a sealing ring mounted in the groove of the work holding element, said groove presenting a hyperboloidal surface, and lip means formed on the work holding element for maintaining the ring in a seated position and being coextensive with and constituting one boundary edge of the said hyperboloidal surface.

4. A structure according to claim 1 in which the work holding element presents a flat face having a plurality of concentrically arranged ring grooves formed therein.

5. A structure according to claim 1 in which the work holding element presents a curved face.

6. A structure according to claim 1 in which the chuck includes a plurality of work holding bosses arranged in concentric relationship to one another, and a plurality of sealing rings secured around said bosses on respective double curved ring supporting surfaces.

7. A structure according to claim 1 in which the work holding chuck includes a plurality of work holding bosses arranged in concentric relationship, and clamping means for engaging a work piece while supported on one of the work holding bosses.

8. A structure according to claim 1 in which the hyperboloidal surface terminates in a lip of a diameter slightly greater than the inner diameter of a sealing ring, said hyperboloidal surface extending in a direction away from the said lip with a gradually increasing diameter exceeding the inner diameter of the sealing member.

9. A structure according to claim 2 in which the face of the said chuck is recessed.

References Cited in the file of this patent

UNITED STATES PATENTS

| | | |
|---|---|---|
| 2,398,959 | Petry | Apr. 23, 1946 |
| 2,443,987 | Morrison et al. | June 22, 1948 |